(12) United States Patent
DiSabatino

(10) Patent No.: US 7,007,727 B2
(45) Date of Patent: Mar. 7, 2006

(54) DISC SAW FELLING HEAD HOUSING IMPROVEMENTS

(75) Inventor: Benjamin DiSabatino, Brantford (CA)

(73) Assignee: Timberjack Inc., Woodstock (CA)

( * ) Notice: Subject to any disclaimer, the term of this patent is extended or adjusted under 35 U.S.C. 154(b) by 89 days.

(21) Appl. No.: 10/458,213

(22) Filed: Jun. 10, 2003

(65) Prior Publication Data

US 2004/0031369 A1 Feb. 19, 2004

Related U.S. Application Data

(60) Provisional application No. 60/389,159, filed on Jun. 14, 2002.

(51) Int. Cl.
*A01G 23/091* (2006.01)

(52) U.S. Cl. ...................... 144/4.1; 144/34.1

(58) Field of Classification Search ............... 144/335, 144/336, 4.1, 34.1, 34.5, 34.6, 24.12; 83/478; 37/302; 56/255, 295

See application file for complete search history.

(56) References Cited

U.S. PATENT DOCUMENTS

| | | | | |
|---|---|---|---|---|
| 5,113,919 | A | * 5/1992 | MacLennan | 144/34.1 |
| D412,334 | S | * 7/1999 | DiSabatino et al. | D15/133 |
| 6,068,035 | A | * 5/2000 | DiSabatino et al. | 144/34.1 |
| 6,176,280 | B1 | * 1/2001 | DiSabatino et al. | 144/34.1 |
| 6,668,880 | B1 | * 12/2003 | Nordstrom | 144/4.1 |

* cited by examiner

*Primary Examiner*—Derris H. Banks
*Assistant Examiner*—Shelley Self
(74) *Attorney, Agent, or Firm*—Quarles & Brady LLP

(57) ABSTRACT

A disc saw felling head has a replaceable lower blade housing and an optional replaceable wear liner in the housing.

17 Claims, 3 Drawing Sheets

DISC SAW FELLING HEAD HOUSING IMPROVEMENTS

CROSS-REFERENCE TO RELATED APPLICATION

This application claims the benefit of U.S. Provisional Patent Application No. 60/389,159 filed Jun. 14, 2002.

STATEMENT CONCERNING FEDERALLY SPONSORED RESEARCH OR DEVELOPMENT

Not applicable.

FIELD OF THE INVENTION

This invention relates to disc saw felling heads, and in particular to an improved housing for a disc saw felling head.

BACKGROUND OF THE INVENTION

In prior art disc saw felling heads, such as in U.S. Pat. No. 6,068,035, the saw housing is integral to the saw head frame weldment. The lower saw blade guards are bolted on a plane that is below the horizontal level of the saw blade.

During saw head operation, the saw blade ejects chips, dirt and other debris. The vertical walls of the saw housing enclosing the saw blade contain this ejected debris. In some regions, especially in the southeastern United States, this debris includes very abrasive sand that can erode the steel walls of the saw housing to the point that holes appear on the housing. Welding patches to the saw housing walls are typical repairs for these holes.

These repairs are expensive and can keep the machine out of service for long periods of time. Also, qualified service personnel are required to properly perform the repairs.

Very expensive hard facing has been added to the inside of the housing in an effort to improve the life of the components. This has greatly increased the cost of the housing, and when it eventually does wear through, the repairs are even more expensive.

SUMMARY OF THE INVENTION

In the proposed design, the housing includes a wall which spans the thickness of the disc saw blade and is removably fastened to the upper portion of the head.

In a preferred aspect, the saw housing is a separate weldment that is easily replaceable and incorporates all the high wear components. This saw housing may be connected to the saw head frame by means of a flange connection that is above the horizontal level of the saw blade.

The saw housing includes sidewalls radially outward from the saw blade which span the thickness of the blade and include the highest wear components of the housing, since it is the sidewalls that contain the chips, dirt, and other debris from being thrown centrifugally outward by the blade. The saw housing also preferably includes one or more lower saw blade guards, which extends radially inward below the blade far enough to protect at least the saw teeth.

Furthermore, a provision in the housing can be made to insert a hardened steel (or other materials) wear liner that is retained by trapping or clamping it in the housing as the housing is bolted to the saw head frame. The wear liner can cover substantially the entire inner surface of the housing sidewalls, or just a portion of them.

Various methods of trapping the wear liner are possible, but the simplest is to provide a channel around the inside of the housing into which the liner fits. With this method, the liner can be clamped between the lower guard and the upper plate when the housing is bolted to the upper plate.

This design makes the wear liner inexpensive and easily replaceable using only simple tools. If the wear goes beyond the wear liner and the housing wears, then the entire saw housing can be replaced using the same approach.

Another benefit of the invention is that it allows various designs of housings to be studied to help resolve other problems with the saw housing, such as plugging.

The foregoing and other aspects of the invention will appear in the detailed description which follows. In the description, reference is made to the accompanying drawings which illustrate a preferred embodiment of the invention.

DETAILED DESCRIPTION OF THE PREFERRED EMBODIMENT

Figure 1:
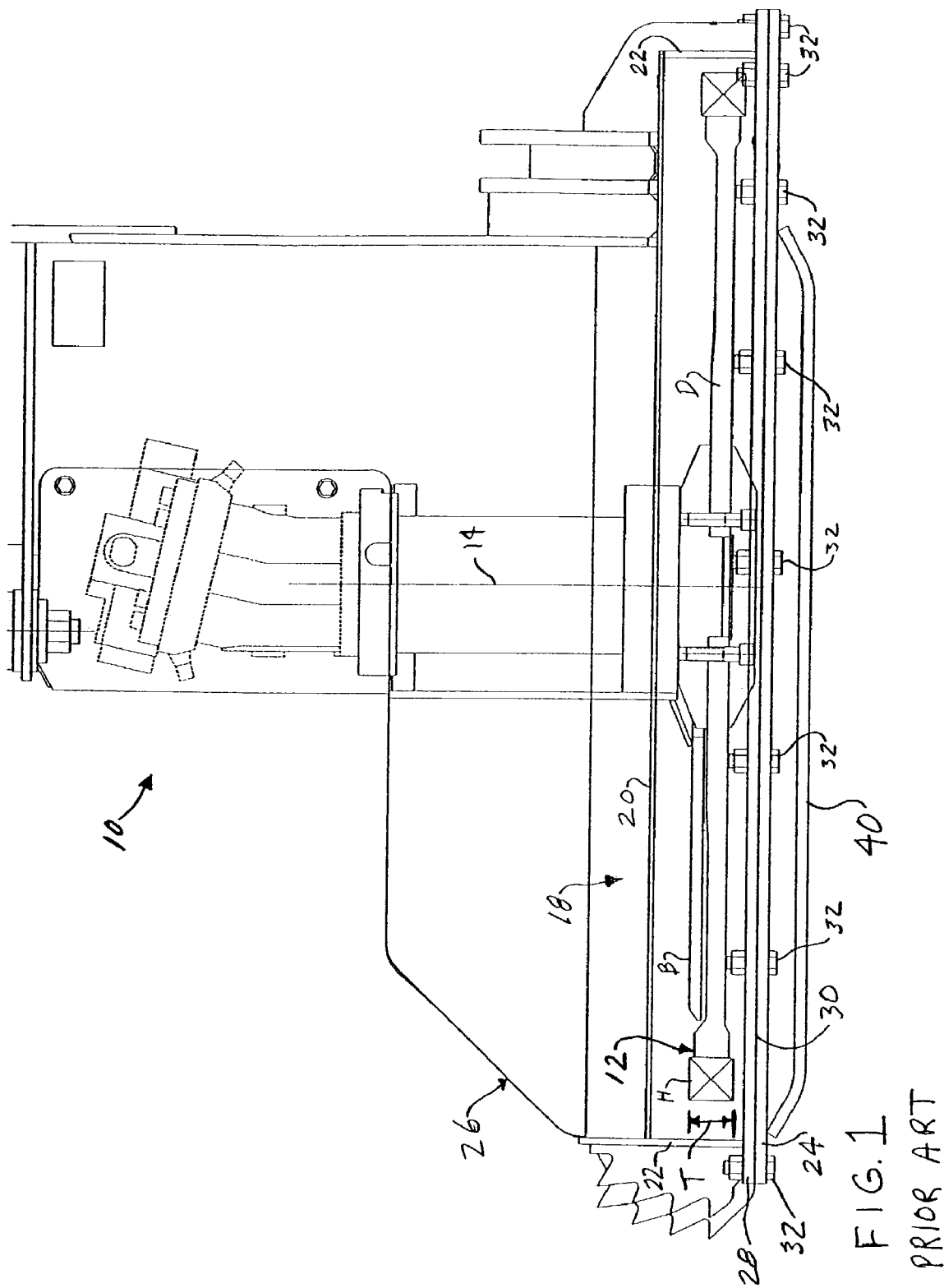
FIG. 1 is a side view of the lower portion of a prior art disc saw felling head with the vertical wall of the saw housing shown as transparent to reveal the saw blade within it.

Referring to FIG. 1, a typical prior art disc saw felling head 10 has a disc saw blade 12 which is rotated about a generally vertical axis 14 to fell a tree. The disc saw 12 extends for a certain thickness T in a cutting plane and is contained within a housing 18 of the head 10. The housing 18 is provided by a top wall 20, side walls 22, and a lower blade guard 24. The top wall 20 and side walls 22 are welded to one another and are part of the main weldment of the head 10 which is referred to herein as the upper portion 26 of the head 10. The upper portion 26 also has a flange 28, which is welded to the side walls 22, and defines at its lower face a bolted face 30 against which the lower blade guard 24 is bolted by fasteners 32. A ski 40 may also be welded or otherwise fastened on each side of the head to the lower blade guards 24.

As is well known in the art, the saw blade 12 includes a series of teeth H fastened around the periphery of disc D, which is bolted to the drive shaft. A butt plate B overlies the disc D at a tree accumulation area at the front of the head and also in this area the teeth H are exposed so as to cut a tree.

Figure 2:
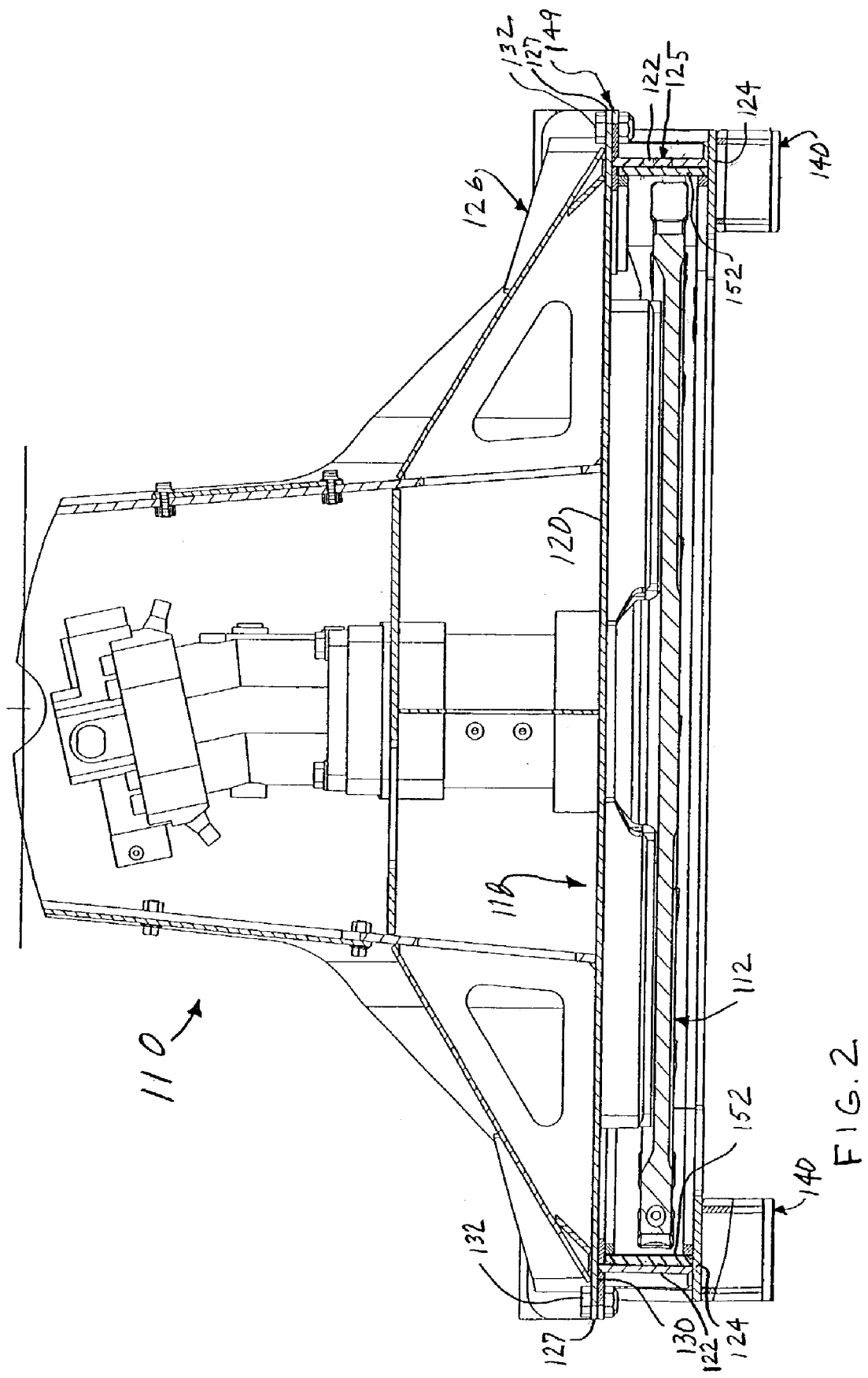
FIG. 2 is a front cross-sectional view of the lower portion of a disc saw felling head incorporating the invention.

A disc saw felling head 110 incorporating the invention is shown in a frontal cross-sectional view in FIG. 2. Corresponding elements are labeled with the same reference number as in FIG. 1 plus 100. The head 110 has, just like the head 10, a disc saw blade 112 contained in a housing 118 (except at the front F of the head where the teeth are exposed for cutting, as mentioned above and shown in FIG. 3). However, in the head 110, the plane of the bolted face 130 of the housing 118 is above the blade 112. Accordingly, the lower blade guard 124, the side walls 122, and an upper flange 149 forms a lower housing weldment 125. The skis 140 are welded to the lower blade guard and so are also part of the lower housing weldment 125. The top wall 120, which also forms part of the housing 118, continues to be part of the upper portion weldment 126 of the head 110, but it extends beyond the side walls 122 so as to form a flange 127 and to form the bolted face 130 which is bolted against the flanges 149 of the lower housing weldment 125 by fasteners 132. This is also shown clearly in FIG. 3.

Figure 4:
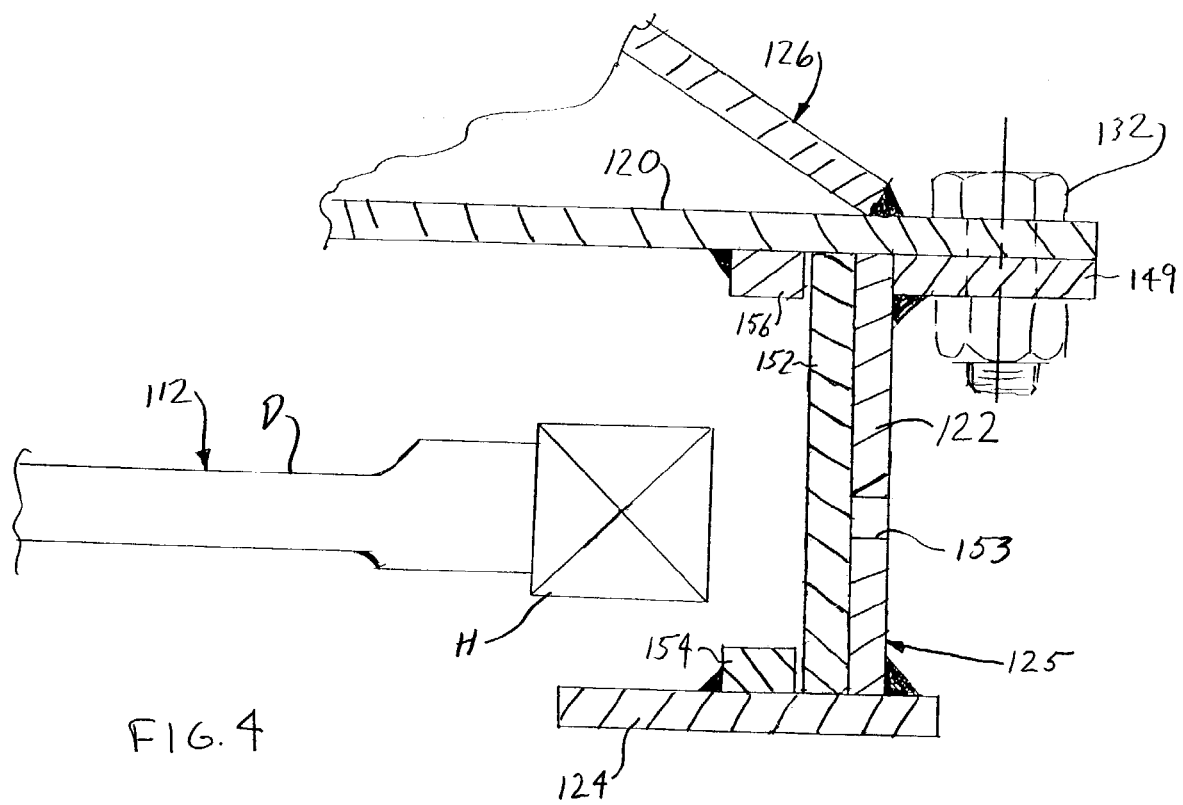
FIG. 4 is a detail cross-sectional view illustrating the replaceable wear liner shown in FIG. 2.

Referring now to FIGS. 2 and 4, optionally, a replaceable wear liner 152 may be provided adjacent to the inside surface of the wall 122. The liner 152 may be secured by any suitable means, including by being received between grooves which are formed on top of the lower blade guard 124 and on the bottom of the top plate 120 by respective bars 154 and 156. The bar 154 is welded to the lower blade guard 124 and the bar 156 is welded to the top plate 120. The liner 152 may be provided continuously around the inside of the wall 122, or it could be provided in sections. In addition, the bars 154 and 156 could be hoop shaped and be continuous, or could be provided in sections being either curved or of any suitable shape to create a retaining groove. Preferably, when the fasteners 132 are tightened, they exert a clamping force on the liner 152 which also retains it and keeps it from rattling. Thereby, the liner 152 can be easily replaced when worn by loosening the fasteners 132, and if the side wall 122 is also worn through, that can also be replaced by replacing the lower housing weldment 125.

In the invention, the lower saw housing is a separate weldment having its bolted face above the blade. The high-wear components of the saw housing are therefore easily replaceable. In addition, as an option, a provision can be made in the housing so as to allow the insertion of a hardened steel or other high-wear material liner that is retained by trapping it in the housing as the housing is bolted to the upper portion of the head. This design makes the wear liner inexpensive and easily replaceable using only simple tools, as is the lower housing. In addition, the invention allows various designs of lower housings to be studied to help resolve any other problems there may be with the housing, such as plugging.

The lower saw housing 125 can be made in one piece, or in several. Making it one piece minimizes cost and assembly. Making it in two or more pieces makes servicing easier and less expensive since the individual pieces are lighter and less expensive. Also the pieces could be split to allow more frequent replacement of high wear areas.

Figure 3:
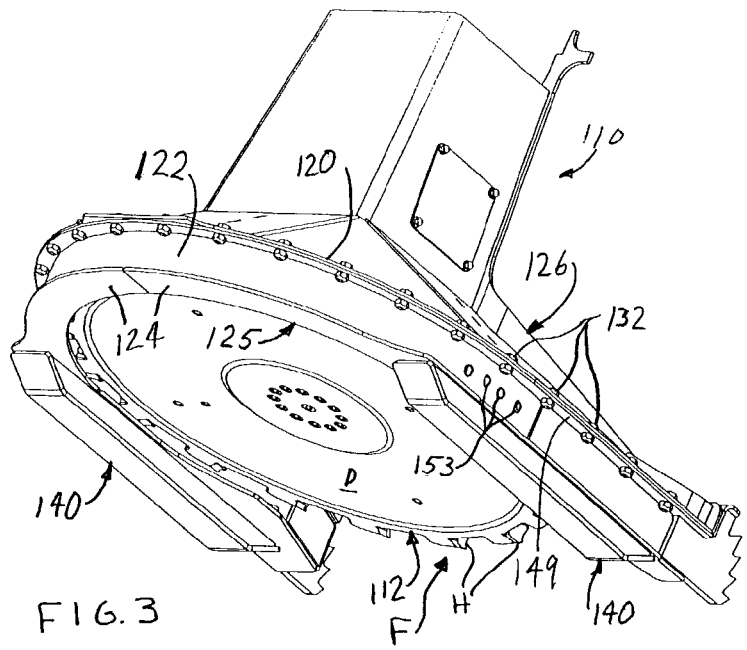
FIG. 3 is a rear bottom perspective view of the head of FIG. 2.

To allow for easy monitoring of wear in the wear liners 152, small holes 153 (FIGS. 3 and 4) can be added to the housing 125 structure at the locations of expected high wear, e.g. through the sidewalls 22 at high wear locations. FIG. 3 shows only one such location as an example of the holes 153. The holes serve as visual indicators to allow for daily inspection of the wear areas. If the operator can see through the holes, then the wear liner is worn through and needs replacing.

Retention of the wear liners 152 can be accomplished by several means. The most service friendly is to "trap" the liners in pockets, as described above, without the need for welding. For more secure retention, the liners can be welded or stitch welded in place. Other means include bolting through the housing walls 122, or using flanges on the wear liners 152 that employ the existing flange connection between the flanges 127, 149.

For best rigidity, the skis 140 and lower flanges 149 are welded integral with the lower housing 126. However they could also be made to bolt on, allowing for their removal from the housing.

A preferred embodiment of the invention has been described in considerable detail. Many modifications and variations to the preferred embodiment described will be apparent those of ordinary skill in the art. Therefore, the invention should not be limited to the embodiment described, but should be defined by the claims which follow.

I claim:

1. In a disc saw felling head having a disc saw blade which is rotated about a generally vertical axis to fell a tree, said disc saw blade extending axially for a certain thickness within a housing, said housing including a top wall which is part of an upper portion of said head, the improvement wherein said housing includes a generally vertical wall which spans the thickness of said disc saw blade and wherein said wall which spans the thickness of said disc saw blade is removably fastened to said upper portion of said head.

2. The improvement of claim 1, further comprising a bolted face and wherein said housing is bolted at said bolted face to the upper portion of said head.

3. The improvement of claim 2, wherein said bolted face is above said disc saw.

4. The improvement of 1, wherein a replaceable liner is provided between said wall of said housing which spans the thickness of said disc saw blade and said blade.

5. The improvement of claim 4, wherein said liner is clamped between said housing and said upper portion of said head.

6. The improvement of claim 4, wherein said liner is captured in a groove of said housing.

7. The improvement of claim 1, wherein said housing includes a lower blade guard which extends radially inwardly below said disc saw blade.

8. The improvement of claim 7 wherein said housing wall which spans the thickness of said disc saw blade is welded to said lower blade guard.

9. The improvement of claim 8, wherein a replaceable liner is supported by said lower blade guard.

10. The improvement of claim 9, wherein said liner is received in a groove of said lower blade guard.

11. The improvement of claim 10, wherein said liner is also received in a groove of said upper portion of said head.

12. The improvement of claim 8, wherein a liner is clamped between said lower blade guard and said upper portion of said head, radially outward of said disc saw blade.

13. The improvement of claim 12, wherein said liner is clamped by the tightening of the fasteners which attach the housing to the upper portion of the head.

14. The improvement of claim 1, wherein skis are provided beneath said removable wall.

15. The improvement of claim 14, wherein said skis are integral with said removable wall.

16. The improvement of claim 1, wherein said housing is in one piece.

17. The improvement of claim 1, further comprising a wear liner in the housing and wherein said which spans the thickness of said disc saw blade wall is provided with at least one opening through which at least a portion of said wear liner inside of the wall can be viewed to determine if the wear liner should be replaced.

* * * * *